US011782703B2

(12) United States Patent
Zhang et al.

(10) Patent No.: US 11,782,703 B2
(45) Date of Patent: Oct. 10, 2023

(54) COMPUTER CODE REFACTORING (71) Applicant: NEC Laboratories America, Inc., Princeton, NJ (US)

(72) Inventors: Xuchao Zhang, Elkridge, MD (US); Haifeng Chen, West Windsor, NJ (US); Wei Cheng, Princeton Junction, NJ (US)

(73) Assignee: NEC Corporation

(*) Notice: Subject to any disclaimer, the term of this patent is extended or adjusted under 35 U.S.C. 154(b) by 0 days.

(21) Appl. No.: 17/739,727

(22) Filed: May 9, 2022

(65) Prior Publication Data
US 2022/0374232 A1 Nov. 24, 2022

Related U.S. Application Data (60) Provisional application No. 63/189,236, filed on May 17, 2021, provisional application No. 63/189,274, filed on May 17, 2021.

(51) Int. Cl.
*G06F 8/72* (2018.01)
*G06F 8/30* (2018.01)

(52) U.S. Cl.
CPC . *G06F 8/72* (2013.01); *G06F 8/30* (2013.01)

(58) Field of Classification Search
CPC .................................... G06F 8/72; G06F 8/30
See application file for complete search history.

(56) References Cited

PUBLICATIONS

Yao et al., "Learning Structural Edits via Incremental Tree Transformations" (Year: 2021).*
TV Nguyen, "Graphix: A Pre-Trained Graph Edit Model for Automated Program Repair" (Year: 2022).*
Li et al., "Code Editing From Few Exemplars by Adaptive Multi-Extent Composition" (Year: 2022).*
Zhang et al., "Learning to Represent Programs with Heterogeneous Graphs" (Year: 2022).*
NDQ Bui et al., "InferCode: Self-Supervised Learning of Code Representations by Predicting Subtrees" (Year: 2021).*
Chakraborty et al., "CODIT: Code Editing With Tree-Based Neural Models" (Year: 2022).*
Dean et al., "Amanuensis: The Programmer's Apprentice" (Year: 2018).*

(Continued)

*Primary Examiner* — Phillip H Nguyen
(74) *Attorney, Agent, or Firm* — Joseph Kolodka (57) ABSTRACT

Systems and methods are provided for automated computer code editing. The method includes training a code-editing neural network model using a corpus of code editing data samples, including the pre-editing samples and post-editing samples, and parsing the pre-editing samples and post-editing samples into an Abstract Syntax Tree (AST). The method further includes using a grammar specification to transform the AST tree into a unified Abstract Syntax Description Language (ASDL) graph for different programming languages, and using a gated graph neural network (GGNN) to compute a vector representation for each node in the unified Abstract Syntax Description Language (ASDL) graph. The method further includes selecting and aggregating support samples based on a query code with a multi-extent ensemble method, and altering the query code iteratively using the pattern learned from the pre- and post-editing samples.

20 Claims, 4 Drawing Sheets

(56) References Cited

PUBLICATIONS

Bianchini, et al., "Recursive neural networks for processing graphs with labelled edges: theory and applications," Neural Networks 18, 2005, pp. 1040-1050.
Li, et al., "Gated graph sequence neural networks," arXiv preprint arXiv:1511.05493v4, 2015, pp. 1-20.
Scarselli, et al.,"The graph neural network model," IEEE Transactions on Neural Networks, vol. 20, No. 1, Jan. 2009, pp. 61-80.
Bianchini, et al., "Face Spotting in Color Images using Recursive Neural Networks," Proceedings of the 1st ANNPR Workshop, 2003, pp. 1-6.
Yao, et al., "Learning structural edits via incremental tree transformations." arXiv preprint arXiv:2101.12087v2, Mar. 5, 2021, pp. 1-20.
Yin, et al., "Learning to represent edits," arXiv preprint arXiv:1810.13337v2, Feb. 22, 2019, pp. 1-22.
Chen, Liu, and Song, "Tree-to-tree neural networks for program translation." arXiv preprint arXiv:1802.03691v3, Oct. 26, 2018, pp. 1-16.
Bowman, et al., "Generating Sentences from a Continuous Space," arXiv preprint arXiv:1511.06349v4, May 12, 2016, pp. 1-12.
Cheng, Fostiropoulos, and Boehm, "GN-Transformer: Fusing AST and Source Code information in Graph Networks," Sep. 28, 2020, pp. 1-22.
Gori, Monfardini and Scarselli, "A new model for learning in graph domains," Proceedings 2005 IEEE International Joint Conference on Neural Networks, 2005, vol. 2, pp. 729-734.

\* cited by examiner

COMPUTER CODE REFACTORING

RELATED APPLICATION INFORMATION

This application claims priority to U.S. Provisional Patent Application No. 63/189,236, filed on May 17, 2021, and U.S. Provisional Patent Application No. 63/189,274, filed on May 17, 2021, both incorporated herein by reference in their entirety.

BACKGROUND

Technical Field

The present invention relates to editing computer code and software from a first state to a modified second state that is more efficient using a neural network, and more particularly to use of neural network encoders utilizing to convert computer code and software from a first state to a modified second state.

Description of the Related Art

Neural Network Encoders are a type of artificial neural network used to learn efficient codings of unlabeled data. An encoder can take input data and transform it into state values. A decoder can map the encoded state values to an output. Machine translation relates to automatically converting source text in one language to output text in another language; an input sequence is processed to produce an output sequence.

Code editing in software engineering intends to revise the design, structure, functionality, or implementation of existing programming codes into a desirable format. Refactoring transforms computer code into a new form that behaves the same as before but may be more efficient. Automatic refactoring can remove dead and redundant code without changing a system's functionality and converts unstructured code into well-structured code and procedural code into object-oriented code.

A decomposition paradigm in computer programming is a strategy for organizing a program as a number of parts, and it usually implies a specific way to organize a program text. Few-shot learning is the problem of making predictions based on a limited number of samples.

SUMMARY

According to an aspect of the present invention, a method is provided for automated computer code editing. The method includes training a code-editing neural network model using a corpus of code editing data samples, including the pre-editing samples and post-editing samples, and parsing the pre-editing samples and post-editing samples into an Abstract Syntax Tree (AST). The method further includes using a grammar specification to transform the AST tree into a unified Abstract Syntax Description Language (ASDL) graph for different programming languages, and using a gated graph neural network (GGNN) to compute a vector representation for each node in the unified Abstract Syntax Description Language (ASDL) graph. The method further includes selecting and aggregating support samples based on a query code with a multi-extent ensemble method, and altering the query code iteratively using the code-editing neural network model and the pattern learned from the pre- and post-editing samples.

According to another aspect of the present invention, a system is provided for automated computer code editing. The system includes one or more processors, a computer memory operatively coupled to at least one of the one or more processors, and a computer display operatively coupled to the computer memory and the at least one of the one or more processors, wherein the computer memory contains instruction code that can cause the computer system to perform the operations of: training a code-editing neural network model using a corpus of code editing data samples, including the pre-editing samples and post-editing samples; parsing the pre-editing samples and post-editing samples into an Abstract Syntax Tree (AST); using a grammar specification to transform the AST tree into a unified Abstract Syntax Description Language (ASDL) graph for different programming languages; using a gated graph neural network (GGNN) to compute a vector representation for each node in the unified Abstract Syntax Description Language (ASDL) graph; selecting and aggregating support samples based on a query code with a multi-extent ensemble method; and altering the query code iteratively using the code-editing neural network model and the pattern learned from the pre- and post-editing samples.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with embodiments of the present invention, systems and methods are provided for the process of restructuring existing computer code or programming language. Computer programming is interested in refactoring a piece of code following few instances that showcasing a certain edit pattern or coding style. Refactoring is intended to improve the design, structure, and/or implementation of the software, while preserving its functionality. An edit pattern can be adapted from given code examples to the query code which is written in different content. Given edit actions of code samples in the support set can be combined and new edit representations generated to edit a query code. Similarity over code syntax trees can be measured before editing between query and support samples.

In one or more embodiments, a graph-based tree encoder can be utilized to convert computer code and software from a first state to a modified second state, where the second state behaves the same as before but is more efficient.

In a Non-Limiting Exemplary Embodiment:

Input: Both exemplars and new query code;

Pre-edit:

normalized=list(filter(lambda x: x is not None, map(harvester.normalize, harvested[:25])))

Post-Edit:

normalized=list([x for x in map(harvester.normalize, harvested[:25]) if x is not None])

New Query:

chunk=filter(lambda x: x.feature==feature, ichunk

Output (edited code for new query using the learned pattern from exemplars):

chunk=[x for x in ichunk if x.feature==feature].

In one or more embodiments, given a corpus of code editing data samples, including the pre-editing and post-editing samples, and their corresponding editing types, a code editing model can be learned from a few edits and transfer the knowledge (capability of handling the task in trained edit types) to an unknown edit type for which no training data is available. Codes in the same project can be uniform with regard to some typical coding style. A Code Editing Approach from Few-shot Samples (CEFS) is presented to address the code editing problem under the setting that only a few samples are available to demonstrate how to edit the code. A standard coding style can be automatically applied to a project, so as to save human programmers from having to manually inspect written computer code.

In various embodiments, the similarity over code syntax trees can be measured before the editing between query and support samples and use the signals of similarity for edit combinations. In editing, some actions can simply borrow due to the consistency in some individual nodes in the syntax tree, while some rely on the surroundings. For which purpose, we measure the similarity among multi-extent between individual nodes and the collective over the whole syntax trees.

In various embodiments, an abstract syntax tree can be employed to denote the computer code, such as $C_-$ and $C_+$ for the input code abstract syntax tree and the desirable output tree, respectively. Denote the input code abstract syntax tree as $C_-$ and the desirable output tree as $C_+$, we are giving a set of samples containing K instances belonging to the same editorial manner: $\mathcal{S} = \{(\mathcal{C}_-^k, \mathcal{C}_+^k)\}_{k=1}^K$;

and want to adapt the underlying editorial pattern in S sharing among the K samples on query sample $\mathcal{C}_-^Q$, even the tree before editing do not share the same programming content.

The Graph2Edit framework can include: 1) a graph-based tree encoder embeds the input abstract syntax tree $C_-$ into vector $Z \in \mathbb{R}^{N \times D}$, where N is the number of nodes and D is the feature dimension; 2) an edit encoder, $f_\Delta$, to embed input and corresponding output into vector $f_\Delta: (C_-, C_+) \to \mathbb{R}^D$ that represent the sequential edit actions, as well as the edit pattern; 3) a decoder for prediction working conditionally on the tree embedding and edit representation. Predictions include: the operation (add/delete a node, add a subtree, or stop the editing), the executed location on abstract syntax tree, and associated action values, conditionally on the tree embedding and edit representation.

Denoting $g_{1:t} = (g_1, \ldots, g_t)$ as the tree embedding history and $a_{1:t} = (a_1, \ldots, a_t)$ the edit history until step t. The editing is:

$$Pr(a_{1:T}|f_\Delta, g_1) = Pr(a_1|f_\Delta, g_1) Pr(a_2|f_\Delta, g_2) \ldots Pr(a_T|f_\Delta, g_T)$$

$$\Pi_{t=1}^T Pr(a_t|f_\Delta, g_{1:t}).$$

It may be assumed that if the initial input tree of a support sample CS shares more similarity with the query input tree CE, the query sample would enjoy a greater likelihood to adopt the support sample's edit representation for correct self-editing.

In various embodiments, similarity measurements between query samples and support samples on the output space, Z, of the tree encoder are conducted. A convex combination of edit representations from support set, $S_\Delta = \{f_\Delta(C_-^k, C_+^k)\}_{k=1}^K$, which maximizes the adoptability of edit representations for query sample from existing resources are learned. The outputs of tree encoder represent each node in abstract syntax tree with a one-dimensional vector and any standard graph pooling operation over all nodes, such as mean pooling or max pooling, can be used to obtain the global representation for an individual $C_-$ sample (either support or query).

For example, Abstract Syntax Trees (ASTs) are often generated by compilers when they're running on code. What most compilers do is generate an AST first from the computer language being compiling from, and another part of the code can then read the AST and generating new computer code from it. It is a syntax tree because the syntax of the language is being represented. The syntax of something is the structure of statements. To have valid syntax means that you have written something that makes sense based on the particular rules of grammar.

A similarity measurement between query samples and support samples on the output space, Z, of tree encoder can be conducted, and turn back the measurement to learn a convex combination of edit representations from support set, $S_\Delta = \{f_\Delta(C_-^k, C_+^k)\}_{k=1}^K$, which maximizes the adoptability of edit representations for query sample from existing resources.

On the basis of code editing and abstract syntax tree, some editing on a node is chosen upon its context, while some editing should be invariant of its neighbor nodes, e.g., the removal of a bucket should be blind to the content inside. From this perspective, we design a multi-extent graph pooling measurement to perform sliding tradeoffs between the matching of individual nodes and collective tree representation.

However, such standard graph pooling operations do not consider the matching between individual nodes among samples.

On the basis of code editing and abstract syntax tree, some editing on a node is chosen upon its context, while some editing should be invariant of its neighbor nodes, e.g., the removal of a bucket should be blind to the content inside. From this perspective, we design a multi-extent graph pooling measurement to perform sliding tradeoffs between the matching of individual nodes and collective tree representation.

Instead of simply averaging all node representations, we design to emphasize some individual nodes that meet a similar node in the opposite sample. Let $z_n^q$ and $z_n^s$ denote the n-th node representation of query and support sample, respectively, and $\phi(\cdot, \cdot): Z \times Z \to \mathbb{R}$ be a query-support similarity measurement that takes the node representation as input. Based on these, the query support node matching degree can be calculated as follows:

$$m_n^q := \max\{\varphi(g_\theta^q(z_n^q), g_\theta^s(z_i^s))\}_{i=1}^{N_s} \text{ and}$$

$$m_n^s := \max\{\varphi(g_\theta^q(z_i^q), g_\theta^s(z_n^s))\}_{i=1}^{N_q};$$

where $g_\theta^q(\cdot)$ and $g_\theta^s(\cdot)$ are learnable projections on query and support node representation, $N_q$ and $N_s$ are the number of nodes in query and support sample, respectively. Note that for simplicity the learnable parameter $\theta$ for each module is not distinguished. The maximum operation emphasizes the matching between individual nodes and returns a high value when there is at least one good match in the counterpart. Then we design a $\lambda$-softmax function for matching degree normalization to control the intermediate position between individual node and collective tree:

$$\sigma_{n,\lambda}^q := \frac{N_q \exp(\lambda m_n^q)}{\sum_{i=1}^{N_q} \exp(\lambda m_i^q)} \text{ and}$$

$$\sigma_{n,\lambda}^s := \frac{N_s \exp(\lambda m_n^s)}{\sum_{i=1}^{N_s} \exp(\lambda m_i^s)}.$$

Based on the above individual node representation, the collective tree representation of one query and K support samples are obtained using a weighted average pooling as follows:

$$t_\lambda^q := \frac{1}{N_q K} \sum_{i=1}^{N_q} \sum_{k=1}^{K} \sigma_{n,\lambda}^{qs_k} z_n^q \text{ and}$$

$$t_\lambda^{s_k} := \frac{1}{N_q K} \sum_{n=1}^{N_{s_k}} \sigma_{n,\lambda}^{s_k} z_n^{s_k},$$

where $\sigma_{n,\lambda}^{qs_k}$ is the activation from query and the k-th sample $s_k$ in the support set. An intuitive interpretation on variable $\lambda$ is that the larger $\lambda$ denotes the greater the domination of individual nodes in the tree representation, i.e., the sharpness with $\lambda$-softmax normalization. $\lambda \to 0$ preserves the tree representation t as its initial after mean pooling, and $\lambda \to \infty$ represents the tree approximately with only one single node at most of the times, where the node is selected upon the maximum activation from $m_n^q$ and $m_n^s$. This property holds due to the monotonous increase of the first-order gradient of exponential function.

With the collective tree representation, we have the updated tree representation that yields the expressions on the generation of edit representation for query sample editing:

$$f_\Delta^q := \Sigma_{k=1}^K \phi(t_\lambda^q, t_\lambda^{s_k}) f_\Delta(C_-^k, C_+^k);$$

where $\varphi(\cdot, \cdot)$ is a similarity measure over query and support tree representations.

A single extent may not be good enough to generalize and fully cover the measurement for a robust coefficient, $\phi(t_\lambda^q, t_\lambda^{s_k})$, for combination. Meanwhile, it is hard to access the optimal position between individual and collective, i.e., $\lambda$, since code editing samples suffer from a good variance. We hereby propose a multi-extent individual-collective measurement to complement such the potential weakness by setting multiple $\lambda$ with various values, and ensemble all the results $\phi(t_\lambda^q, t_\lambda^{s_k})$ for $\{\lambda_i\}_{i=1}^{N_\lambda}$ to help the generalization on complicated code samples.

However, when setting $\lambda$ in the model configurations arbitrarily, not all extents are conductive deliver a good tree representation, and some might corrupt the overall tree representation, and $t_\lambda^q$, and deteriorates the model. For a robust ensemble and aggregation, we consider assessing the quality of $\phi(t_\lambda^q, t_\lambda^{s_k})$ towards different $\lambda_i$ by using a marginal ranking error on edit representation. Since the ground-truth $C_+^q$ is accessible in training, we make the ranking error explicitly reflect how good the combinatorial coefficients for one $\lambda$ agree with the actual similarity between the query sample and K support samples. In inference phase, due to $C_+^q$ being missing, we introduce an external predictor R to predict the quality of each $\lambda$, and use the outcomes for ensemble. R is trained in the training process and implemented as a multilayer perceptron.

We firstly measure the similarity between query and support edit representations via cosine similarity:

$$s_k := \frac{f_\Delta(C_-^q, C_+^q) \cdot f_\Delta(C_-^{s_k}, C_+^{s_k})}{\|f_\Delta(C_-^q, C_+^q)\| \|f_\Delta(C_-^{s_k}, C_+^{s_k})\|};$$

Then the error for each $\lambda$ can be accessed by:

$$l_\lambda := \Sigma_{k=1}^K (s_{\Gamma(1)} - s_{\Gamma(k)}) \max\{0, \rho - \phi(t_\lambda^q, t_\lambda^{s_{\Gamma(1)}}) - \phi(t_\lambda^q, t_\lambda^{s_{\Gamma(k)}}))\};$$

where $\Gamma(\cdot)$ is the index mapping for K support samples that satisfy $s\Gamma(1) \geq s\Gamma(2) \geq \ldots \geq s\Gamma(k)$, i.e., the mapping to sort $s_k$ in a descending order, and $\rho$ is the margin set as a hyperparameter. The formulation indicates how well the nearest support samples can outperform other support samples, and the factor $(s_{\Gamma(1)} - s_{\Gamma(k)})$ reveals the error confidence. Note that the above error term depends on the edit model $f_\Delta$ and may only be an approximate estimation.

We can involve multiple extent $\lambda$ and the reciprocal of its error to adaptively ensemble and form the edit representation:

$$f_\Delta^q := \sum_{k=1}^K \sum_{i=1}^{N_\lambda} \frac{\alpha}{l_{\lambda_i}} \phi(t_\lambda^q, t_{\lambda_i}^{s_k}) f_\Delta(C_-^k, C_+^k).$$

We make the training as a meta-training process and optimize the networks across a series of training episodes containing one query samples and a support set with K support samples. In training, we provide the ground-truth $C_+$ for query sample so we can explicitly calculate $l_\lambda$ for each $\lambda$ and train the predictor, R, to approach such distribution.

In various embodiments, all support samples and the query sample can be inputted in one episode into $R: \mathbb{R}^{(K+1) \times D} \to \mathbb{R}^{N_\lambda}$ and minimize the following distributional discrepancy.

$$argmin_R D_{KL}(R(z^q, z^{s_1}, z^{s_2}, \ldots, z^{s_n},) \| (l_1, l_2, \ldots, l_{N_\lambda}) = \mathbb{E}_{\hat{l}_\lambda}\left[\log \frac{\hat{l}_\lambda}{l_\lambda}\right];$$

while simply replacing $l_\lambda$ to $\hat{l}_\lambda$ yields the formulation in inference time. For the rest of the model, the complete training objective function is defined as:

$$L := \Sigma_{i=1}^{N_\lambda} + L_Y$$

while $L_Y$ is equivalent to jointly maximizing the probability of each edit decoder module making the gold decision (predict the operations, localize the execute node, and associated operational values) at each time step.

Figure 1:
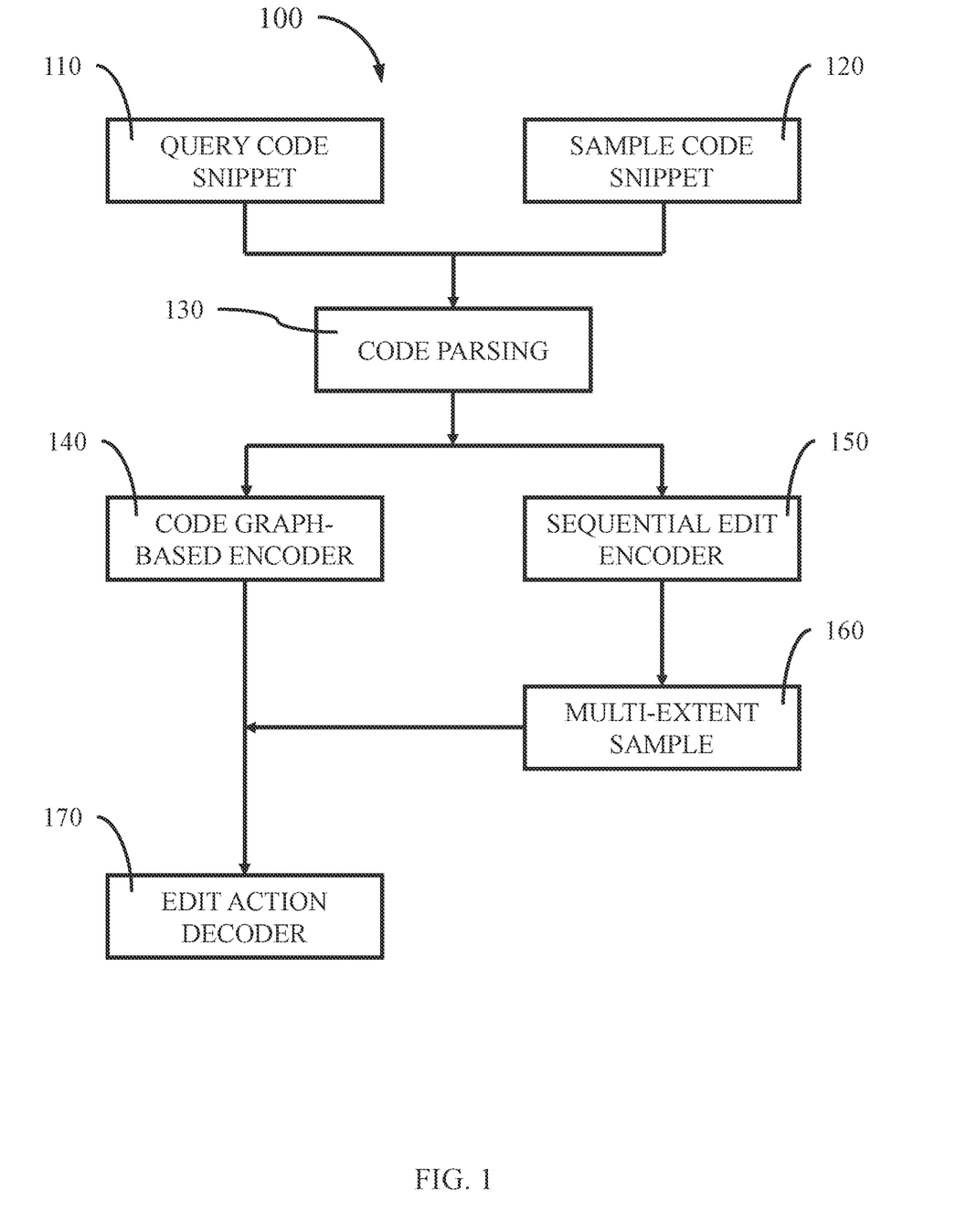
FIG. 1 is a block/flow diagram illustrating a high-level system/method for Code Editing Approach from Few-shot Samples (CEFS) to address the code editing problem, in accordance with an embodiment of the present invention.

Referring now in detail to the figures in which like numerals represent the same or similar elements, FIG. 1 is a block/flow diagram illustrating a high-level system/method for Code Editing Approach from Few-shot Samples (CEFS) to address the code editing problem, in accordance with an embodiment of the present invention.

At block 110, query code snippet corpus data includes a set of query code snippets for each edit type. The query code is used as the initial input for code editing. In a training phase, both the pre-edit and post-edit code snippets are given for training purpose, but during testing phase, the pre-edit code snippet can be used. The editing exemplar, containing the original and modified support code snippets, showcases a certain editorial pattern and implies the edit intention for a query code snippet. A machine learning approach adapts the editorial pattern derived from few exemplars to a query code snippet.

At block 120, for each query code, a set of support code snippets are given as the edit samples. Both of the pre-edit and post-edit code snippets are given in training and testing phases. The support samples should belong to the same edit category.

At block 130, the code snippets are parsed into its Abstract Syntax Tree (AST) format and then the grammar specification is used to transform the AST format to an Abstract Syntax Description Language (ASDL) format as an abstract representation graph of the code. The code snippets can be parsed using language-specific grammar into abstract syntax trees. Abstract Syntax Description Language (ASDL) is a language designed to describe the tree-like data structures. ASDL makes the code go beyond a sequence of programming tokens and represent it as a grammatically meaningful syntactic tree structure. We extend the original AST tree by adding bidirectional edges between parent and child nodes, as well as adjacent sibling nodes. Graph2Edit employs an edit encoder to embed sequential edit actions, and feed it with the tree embedding of a piece of code. Then, it predicts the edit operation, the edit location, as well as associated action values, and repeat the procedure with multiple steps.

At block 140, a gated graph neural network (GGCN) is used to compute a vector representation for each node in ASDL graph. Mean-pool can be used to represent the whole graph.

At block 150, given an edit pair, a vector to represent the intent behind edits can be learned, where the vector includes the necessary information to represent the edit, such as token-level differences between pre-edit and post-edit code snippets. An edit representation can be learned by encoding the sequence of structural edit actions that transforms pre-edit and post-edit codes.

At block 160, based on the edit representations of the support sample set generated at block 150, an aggregate of the support samples can be selected based on the query code in the following steps: Query and Support Activation Learning, Collective Graph Representation Generation, and Multi-Extent Ensemble.

In various embodiments, a multi-extent ensemble method can be used to learn how to transform the support samples based on the features of query code.

At block 170, an edit decoder predicts an action using three components: an operator predictor, a node selector, and a node value predictor. At each time, the operator predictor will decide the operator form the following four options: Delete, Add, CopySubTree, Stop. Then, the node selector predicts a node from the tree to locate the target position for applying one of the four operations. Finally, if the operation is either Add or CopySubTree, the value predictor will determine additional values of these operators.

The Process can Include:

Step 1. Code Preprocessing and Parsing. In this step, we parse the code snippets into its Abstract Syntax Tree (AST) format and then use the grammar specification to transform the AST tree into a unified graph for different programming languages.

Step 2. Graph-base Code Encoder. we use a gated graph neural network (GGCN) to compute a vector representation for each node in ASDL graph.

Step 3. Sequential Edit Encoder. Given an edit pair, we aim to learn a vector to represent the intent behind edits, which includes the necessary information to represent the edit.

Step 4. Multi-Extent Sample Ensemble. we select and aggregate the support samples based on the query code with a multi-extent ensemble method to learn how to transform.

Step 5. Edit Action Decoder. The edit decoder predicts the actions of the edit in three aspects: an operator, the node position, and the corresponding node value.

Figure 2:
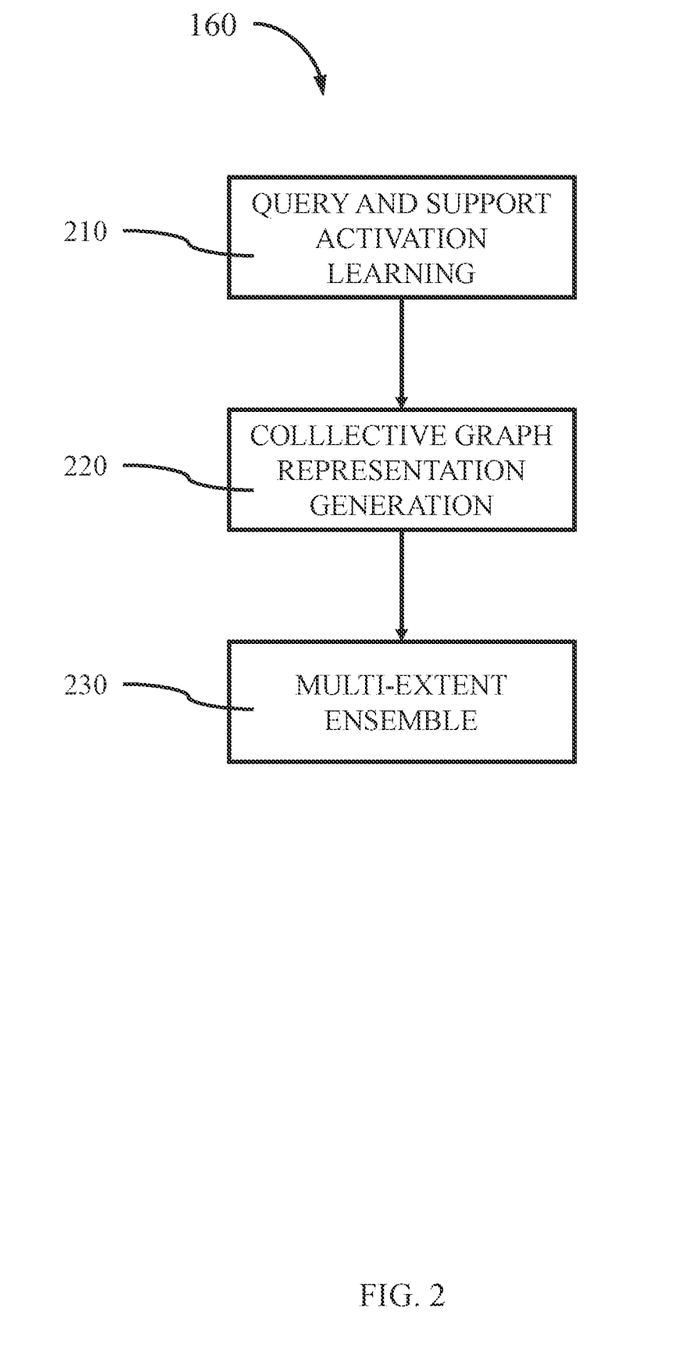
FIG. 2 is a block/flow diagram illustrating a system/method for aggregating the support samples based on the query code based on multi-extent sample composition, in accordance with an embodiment of the present invention.

FIG. 2 is a block/flow diagram illustrating a system/method for aggregating the support samples based on the query code using multi-extent sample composition, in accordance with an embodiment of the present invention.

At block 210, the activations are calculated for both query and support samples; specifically considering the similarity measure $\varphi\varphi(\cdot,\cdot)$ with one query and one support sample. The activation of query and support samples are defined as follows:

$$\sigma_n^q := \max\{\varphi(f_q(z_n^q), f_s(z_i^s))\}_{i=1}^{N_s} \text{ and}$$

$$\sigma_n^s := \max\{\varphi(f_s(z_n^s), f_q(z_i^q))\}_{i=1}^{N_q};$$

where $f_q(\cdot)$ and $f_s(\cdot)$ are linear projects for query and support samples, respectively. The maximum operation emphasizes the matching between individual nodes and will return a high value when there is at least one good match in the opposite tree.

At block 220, the activations of query and support to generate the code graph representation with an additional variable to control the intermediate position between individual and collective graph attention. The enhanced query activation can be represented as follows:

$$\sigma_{n,\lambda}^q := \frac{N \exp(\lambda \sigma_n^q)}{\sum_{i=1}^{N_q} \exp(\lambda \sigma_i^q)}.$$

Then the graph representation of query and support code graph can be generated as follows:

$$t_\lambda^q := \sum_{i=1}^{N_q} \sum_{k=1}^{K} \frac{1}{K} \sigma_{n,\lambda}^{q_k} z_n^q;$$

$$t_\lambda^s := \sum_{n=1}^{N_s} \sigma_{n,\lambda}^s z_n^s.$$

Where $z_n^q$ and $z_n^s$ are the node representation of the n-th node in the query and support code graph.

At block 230, a multi-extent ensemble method is used to select and aggregate the support samples' edit representation. A multi-layer perceptron predictor, R, can be used to predict the quality of the similarity $\phi(t_\lambda^q, t_\lambda^s)$ between query code representation $t_\lambda^q$ and support sample representation $t_\lambda^s$. The inversed quality of the similarity measurement can be calculated as:

$$l_\lambda := \Sigma_{i=2}^K (s_{\Gamma(1)} - s_{\Gamma(i)}) \max\{0, \rho - (\phi(t_\lambda^q, t_\lambda^{s\Gamma(1)})) - \phi(t_\lambda^q, t_\lambda^{s\Gamma(i)}))\};$$

where $\Gamma(\cdot)$ is the index mapping to sort $S_K$ in a descending order. Then we can obtain the tree representation by adaptively ensemble the outcomes from multiple extents as:

$$f_\Delta^q := \sum_{k=1}^K \sum_{i=1}^{N_\lambda} \frac{\alpha}{l_{\lambda_i}} \phi(t_\lambda^q, t_{\lambda_i}^{s_k}) f_\Delta(C_-^k, C_+^k).$$

The loss for predictor R can be represented as:

$$L_{pred} := D_{KL}(R(z^q, z^{s1}, z^{s2}, \ldots, z^{sn}) \| (l_1, l_2, \ldots, l_{N_\lambda})) + \Sigma_{i=1}^{N_\lambda} l_{\lambda_i}.$$

This loss is combined with the decoder loss in block 170 to train the entire model. A model that can automatically achieve the editing for a new query sample by only referring to limited code samples with different content but the same editorial pattern can be trained.

Figure 3:
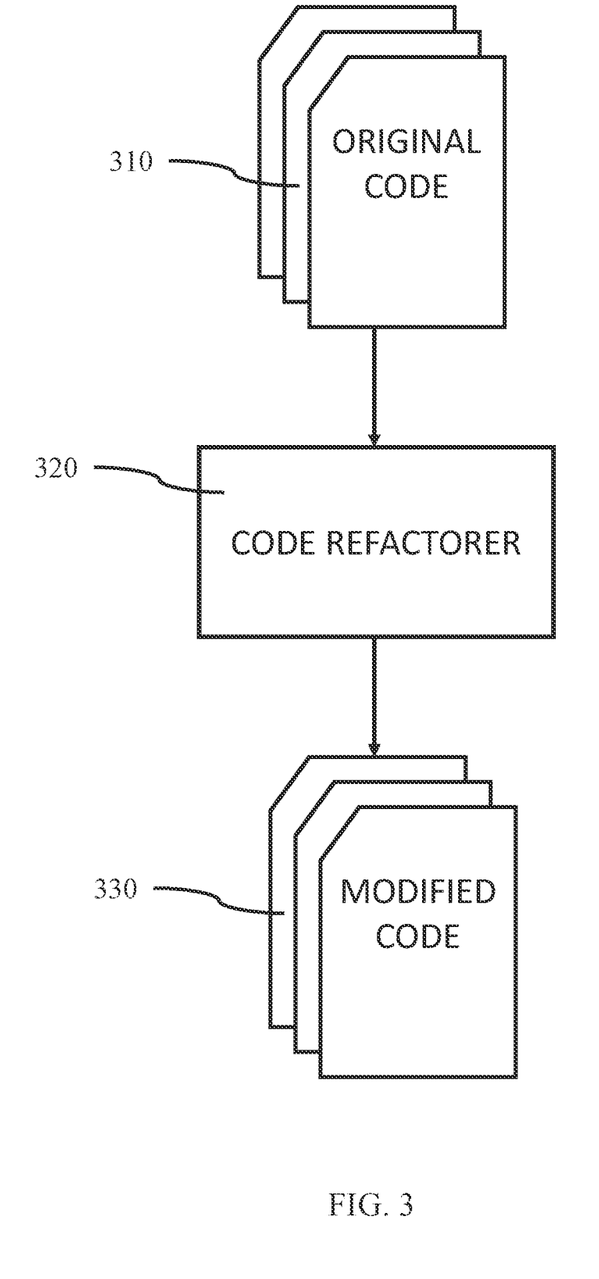
FIG. 3 is a block diagram illustrating a computer system/method for computer code refactoring of inputted computer code, in accordance with an embodiment of the present invention.

FIG. 3 is a block diagram illustrating a computer system/method for computer code refactoring of inputted computer code, in accordance with an embodiment of the present invention.

In one or more embodiments, original computer code 310 can be fed into the code refactorer 320, which outputs a modified version 330 of the inputted code that is altered from the query code by iteratively using the pattern learned from the pre- and post-editing samples to generate more efficient code. The code refactorer 320 can include a trained graph neural network that can include a Graph-base Code Encoder and an Edit Action Decoder. The Graph-base Code Encoder can compute a vector representation for each node in ASDL graph using a gated graph neural network (GGCN).

Figure 4:
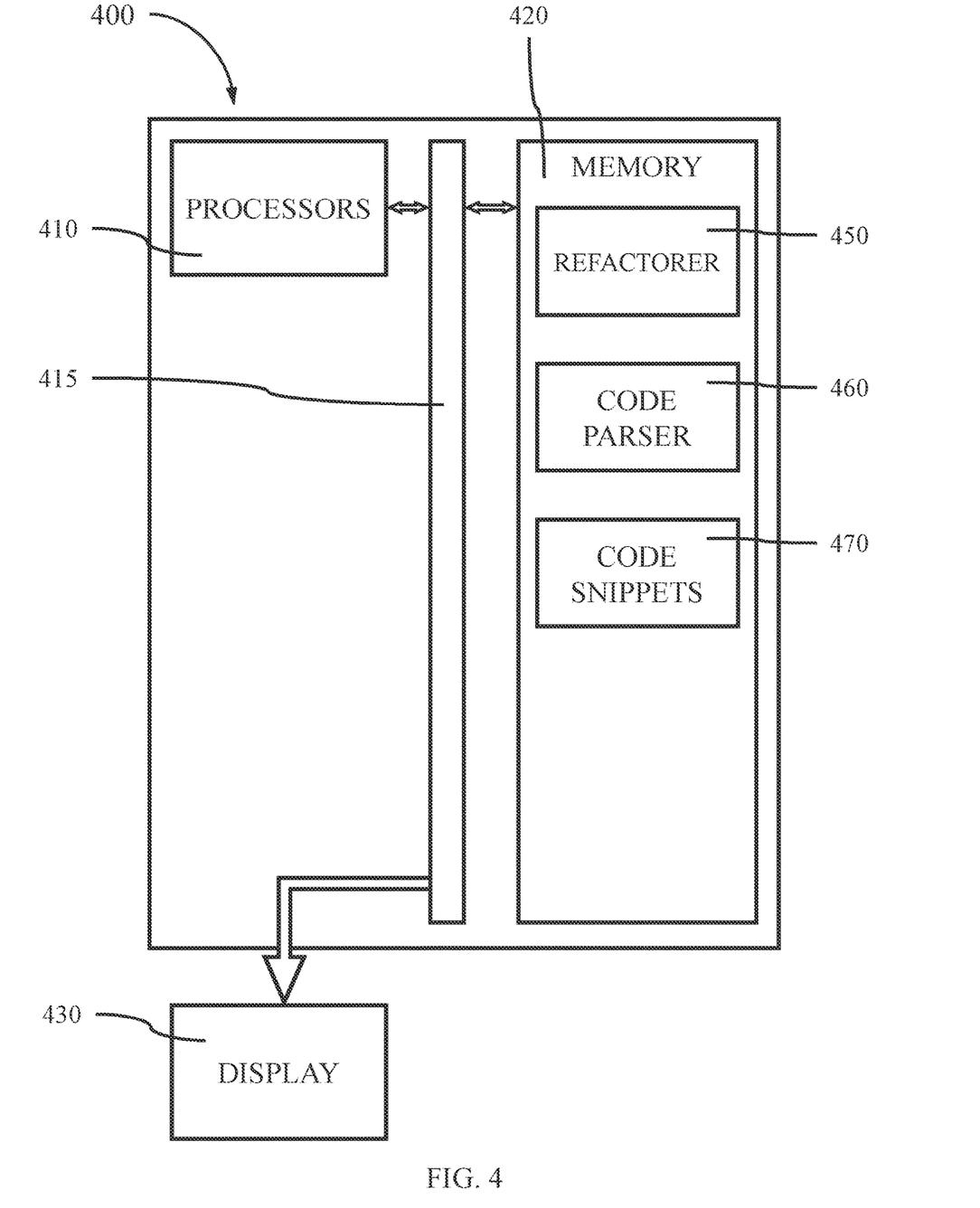
FIG. 4 is a block diagram illustrating a computer system for computer code refactoring, in accordance with an embodiment of the present invention.

FIG. 4 is a block diagram illustrating a computer system for computer code refactoring, in accordance with an embodiment of the present invention.

In one or more embodiments, the computer refactoring system 400 can include one or more processors 410, which can be central processing units (CPUs), graphics processing units (GPUs), and combinations thereof, and a computer memory 420 in electronic communication with the one or more processors 410, where the computer memory 420 can be random access memory (RAM), solid state drives (SSDs), hard disk drives (HDDs), optical disk drives (ODD), etc. The memory 420 can be configured to store code snippets 470, a code parser 460, and a refactorer 450. The code snippets 470 can be query code snippets and/or sample code snippets. The code parser 460 can be configured to parse the code snippets into an Abstract Syntax Tree (AST) format and then transform the AST format to an Abstract Syntax Description Lanuguage (ASDL) format using grammar specifications as an abstract representation graph of the code. The refactorer 450 can be configured to generate new computer code from inputted code using a trained neural network implementing a code graph-based encoder 140 and a sequential edit encoder 150 with an edit action decoder 170. A Multi-Extent Sample Ensemble 160 can select and aggregate the support samples based on the query code. The computer display module 430 can present the original code and the modified code to a user. The memory 420 and one or more processors 410 can be in electronic communication with a display screen 430 over a system bus 415 and I/O controllers, where the display screen 430 can present the output of the refactorer 450 to the user.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer implemented method for automated computer code editing, comprising:
   training a code-editing neural network model using a corpus of code editing data samples, including the pre-editing samples and post-editing samples;
   parsing the pre-editing samples and post-editing samples into an Abstract Syntax Tree (AST);
   using a grammar specification to transform the AST tree into a unified Abstract Syntax Description Language (ASDL) graph for different programming languages;
   using a gated graph neural network (GGNN) to compute a vector representation for each node in the unified Abstract Syntax Description Language (ASDL) graph;
   selecting and aggregating support samples based on a query code with a multi-extent ensemble method; and
   altering the query code iteratively using the code-editing neural network model and the pattern learned from the pre- and post-editing samples.

2. The computer implemented method of claim 1, wherein the pre-editing samples and post-editing samples are combined using the multi-extent ensemble method.

3. The computer implemented method of claim 2, wherein a query code snippet corpus data includes a set of query code snippets for each edit type.

4. The computer implemented method of claim 3, further comprising inputting the query code as an initial input for code editing.

5. The computer implemented method of claim 4, wherein the query code is a set of support code snippets provided as edit samples for both the pre-edit and post-edit code snippets in training.

6. The computer implemented method of claim 5, further comprising extending the original AST tree by adding bidirectional edges between parent and child nodes.

7. The computer implemented method of claim 6, further comprising utilizing mean-pool to represent a whole graph.

8. The computer implemented method of claim 7, further comprising computing an activation for each of the query and support samples.

9. The computer implemented method of claim 8, wherein the activations of the query and support samples are given by:

$$\sigma_n^q := \max\{\varphi(f_q(z_n^q), f_s(z_i^s))\}_{i=1}^{N_s} \text{ and } \sigma_n^s := \max\{\varphi(f_s(z_n^s), f_q(z_i^q))\}_{i=1}^{N_q},$$

respectively.

10. The computer implemented method of claim 9, wherein the graph representation of a query code graph and a support code graph is generated by:

$$t_\lambda^q := \sum_{n=1}^{N_q} \sum_{k=1}^{K} \frac{1}{K} \sigma_{n,\lambda}^{q_k} z_n^q \text{ and } t_\lambda^S := \sum_{n=1}^{N_s} \sigma_{n,\lambda}^s z_n^s,$$

respectively.

11. A computer system for automated computer code editing, comprising:
   one or more processors;
   a computer memory operatively coupled to at least one of the one or more processors;
   a computer display operatively coupled to the computer memory and the at least one of the one or more processors, wherein the computer memory contains instruction code that can cause the computer system to perform the operations of:

training a code-editing neural network model using a corpus of code editing data samples, including the pre-editing samples and post-editing samples;

parsing the pre-editing samples and post-editing samples into an Abstract Syntax Tree (AST);

using a grammar specification to transform the AST tree into a unified Abstract Syntax Description Language (ASDL) graph for different programming languages;

using a gated graph neural network (GGNN) to compute a vector representation for each node in the unified Abstract Syntax Description Language (ASDL) graph;

selecting and aggregating support samples based on a query code with a multi-extent ensemble method; and altering the query code iteratively using the code-editing neural network model and the pattern learned from the pre- and post-editing samples.

12. The computer system of claim 11, wherein the pre-editing samples and post-editing samples are combined using the multi-extent ensemble method.

13. The computer system of claim 12, wherein a query code snippet corpus data includes a set of query code snippets for each edit type.

14. The computer system of claim 13, further comprising instruction code that can cause the computer system to perform the operations of inputting the query code as an initial input for code editing.

15. The computer system of claim 14, wherein the query code is a set of support code snippets provided as edit samples for both the pre-edit and post-edit code snippets in training.

16. The computer system of claim 15, further comprising instruction code that can cause the computer system to perform the operations of extending the original AST tree by adding bidirectional edges between parent and child nodes.

17. The computer system of claim 16, further comprising instruction code that can cause the computer system to perform the operations of utilizing mean-pool to represent a whole graph.

18. The computer system of claim 17, further comprising instruction code that can cause the computer system to perform the operations of computing an activation for each of the query and support samples.

19. The computer system of claim 18, wherein the activations of the query and support samples are given by:

$$\sigma_n^q := \max\{\varphi(f_q(z_n^q), f_s(z_i^s))\}_{i=1}^{N_s} \text{ and } \sigma_n^s := \max\{(\varphi(f_s(z_n^s), f_q(z_i^q))\}_{i=1}^{N_q},$$

respectively.

20. The computer system of claim 19, wherein the graph representation of a query code graph and a support code graph is generated by:

$$t_\lambda^q := \sum_{n=1}^{N_q} \sum_{k=1}^{K} \frac{1}{K} \sigma_{n,\lambda}^{q_k} \text{ and } z_n^q t_\lambda^S := \sum_{n=1}^{N_s} \sigma_{n,\lambda}^s z_n^s,$$

respectively.

* * * * *